(12) United States Patent
Teraoka et al.

(10) Patent No.: US 11,378,781 B2
(45) Date of Patent: Jul. 5, 2022

(54) CAMERA OPTICAL LENS

(71) Applicant: AAC Optics Solutions Pte. Ltd., Singapore (SG)

(72) Inventors: Hiroyuki Teraoka, Shenzhen (CN); Lei Zhang, Shenzhen (CN); Yanmei Wang, Shenzhen (CN); Wenbo Hu, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 240 days.

(21) Appl. No.: 16/679,311

(22) Filed: Nov. 11, 2019

(65) Prior Publication Data

US 2020/0249436 A1  Aug. 6, 2020

(30) Foreign Application Priority Data

Jan. 31, 2019 (CN) .......................... 201910096133.6

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .... G02B 13/0045; G02B 13/06; G02B 13/18; G02B 3/02; G02B 3/04; G02B 9/62; G02B 9/64
USPC .......................... 359/658, 713, 752, 756, 757
See application file for complete search history.

(56) References Cited

U.S. PATENT DOCUMENTS

| | | | |
|---|---|---|---|
| 2014/0111872 A1* | 4/2014 | Tang ................. | G02B 13/0045 359/713 |
| 2017/0010444 A1* | 1/2017 | Teraoka ............ | G02B 13/0045 |
| 2017/0248770 A1 | 8/2017 | Chen et al. | |
| 2018/0149833 A1* | 5/2018 | Lee ...................... | G02B 27/646 |

FOREIGN PATENT DOCUMENTS

| | | |
|---|---|---|
| CN | 105278079 A | 1/2016 |
| CN | 105278081 A | 1/2016 |
| CN | 205485012 U | 8/2016 |
| CN | 107219613 A | 9/2017 |
| CN | 108152934 A | 6/2018 |

(Continued)

OTHER PUBLICATIONS

Graph of aspheric lens surfaces using https://www.desmos.com/calculator (Year: 2021).*

*Primary Examiner* — Travis S Fissel
(74) *Attorney, Agent, or Firm* — W&G Law Group (57) ABSTRACT

The present disclosure relates to the field of optical lenses and provides a camera optical lens. The camera optical lens includes, from an object side to an image side: a first lens having a positive refractive power, a second lens having a negative refractive power, a third lens having a negative refractive power, a fourth lens, a fifth lens and a sixth lens. The camera optical lens satisfies following conditions: $2.00 \leq R3/R4 \leq 5.00$; $1.50 \leq R1/d1 \leq 3.00$; $0.30 \leq R2/R3 \leq 2.00$; and $1.02 \leq n2/n3 \leq 1.20$. The camera optical lens can achieve a high imaging performance while obtaining a low TTL.

9 Claims, 7 Drawing Sheets

(56) References Cited

FOREIGN PATENT DOCUMENTS

| | | |
|---|---|---|
| CN | 208110147 U | 11/2018 |
| CN | 208297807 U | 12/2018 |
| CN | 109283664 A | 1/2019 |
| JP | 2015121730 A | 7/2015 |
| JP | 2016224136 A | 12/2016 |

\* cited by examiner

CAMERA OPTICAL LENS

TECHNICAL FIELD

The present disclosure relates to the field of optical lens, and more particularly, to a camera optical lens suitable for handheld terminal devices, such as smart phones or digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece and seven-piece lens structures gradually appear in lens designs. There is an urgent need for ultra-thin, wide-angle camera lenses with good optical characteristics and fully corrected chromatic aberration.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
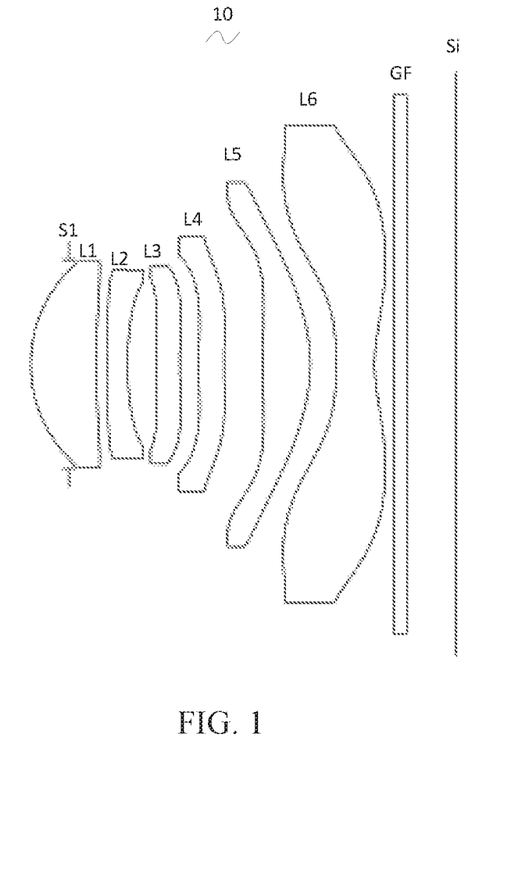
FIG. 1 is a schematic diagram of a structure of a camera optical lens in accordance with Embodiment 1 of the present disclosure.

Referring to the FIG. 1, the present disclosure provides a camera optical lens 10. FIG. 1 shows the camera optical lens 10 according to Embodiment 1 of the present disclosure. The camera optical lens 10 includes 6 lenses. Specifically, the camera optical lens 10 includes, from an object side to an image side, an aperture S1, a first lens L1, a second lens L2, a third lens L3, a fourth lens L4, a fifth lens L5 and a sixth lens L6. An optical element such as an optical filter GF can be arranged between the sixth lens L6 and an image plane Si.

The first lens L1, the second lens L2, the third lens L3, the fourth lens L4, the fifth lens L5 and the sixth lens L6 are all made of a plastic material.

The first lens L1 has a positive refractive power. The second lens L2 has a negative refractive power, and the third lens L3 has a negative refractive power.

An on-axis curvature radius of an object side surface of the second lens L2 is defined as R3. An on-axis curvature radius of an image side surface of the second lens L2 is defined as R4. An on-axis curvature radius of an object side surface of the first lens L1 is defined as R1. An on-axis thickness of the first lens L1 is defined as d1. An on-axis curvature radius of an image side surface of the first lens L1 is defined as R2. A refractive index of the second lens L2 is defined as n2. A refractive index of the third lens L3 is defined as n3. The camera optical lens 10 should satisfy conditions (1)-(4):

$$2.00 \leq R3/R4 \leq 5.00 \qquad (1);$$

$$1.50 \leq R1/d1 \leq 3.00 \qquad (2);$$

$$0.30 \leq R2/R3 \leq 2.00 \qquad (3); \text{ and}$$

$$1.02 \leq n2/n3 \leq 1.20 \qquad (4).$$

The condition (1) specifies a shape of the second lens L2. Out of the range of the condition (1), it is difficult to achieve miniaturization in an FNO bright state.

The condition (2) specifies a ratio of the on-axis curvature radius of the object side surface of the first lens L1 and the on-axis thickness of the first lens L1. Out of the range of the condition (2), it is difficult to achieve miniaturization in the FNO bright state.

The condition (3) specifies a ratio of the on-axis curvature radius of the image side surface of the first lens L1 and the on-axis curvature radius of the object side surface of the second lens L2. The ratio is reasonably controlled in such a manner that the second lens L2 can effectively correct the system aberration. Out of the range of the condition (3), it is difficult to achieve an excellent imaging performance in the FNO bright state.

The condition (4) specifies a ratio of the refractive index of the second lens L2 and the refractive index of the third lens L3. Within the range of the condition (4), the camera optical lens 10 can better correct the system aberration, so as to satisfy the demand for the high-performance imaging.

A total optical length from the object side surface of the first lens L1 to an image plane of the camera optical lens 10 along an optic axis is defined as TTL. When the on-axis thickness and the curvature radius of the camera optical lens 10 of the present disclosure satisfy the above conditions, the camera optical lens 10 will have the advantage of high performance and satisfy the design requirement of wide angle and a low TTL.

In this embodiment, the object side surface of the first lens L1 is convex in the paraxial region, and the image side surface of the first lens L1 is concave in the paraxial region, and the first lens L1 has a positive refractive power. The object side surface of the second lens L2 is convex in the paraxial region, the image side surface of the second lens L2 is concave in the paraxial region, and the second lens L2 has a negative refractive power. An object side surface of the third lens L3 is convex in the paraxial region, an image side surface of the third lens L3 is concave in the paraxial region, and the third lens L3 has a negative refractive power. An object side surface of the fourth lens L4 is convex in the paraxial region, an image side surface of the fourth lens L4 is concave in the paraxial region, and the fourth lens L4 has a positive refractive power. An object side surface of the fifth lens L5 is convex in the paraxial region, an image side surface of the fifth lens L5 is convex in the paraxial region, and the fifth lens L5 has a positive refractive power. An object side surface of the sixth lens L6 is concave in the paraxial region, an image side surface of the sixth lens L6 is concave in the paraxial region, and the sixth lens L6 has a negative refractive power.

An on-axis curvature radius of the object side surface of the fifth lens L5 is defined as R9, and an on-axis curvature radius of the image side surface of the fifth lens L5 is defined as R10. The camera optical lens 10 should satisfy a following condition (5):

$$-13.00 \leq R9/R10 \leq -3.00 \quad (5).$$

The condition (5) specifies a shape of the fifth lens L5. Out of the range of the condition (5), it is difficult to achieve miniaturization in the FNO bright state.

Further, it is preferable to set a numerical range of the condition (5) to a numerical range of a following condition (5-A).

$$-12.00 \leq R9/R10 \leq -5.00 \quad (5\text{-A}).$$

A focal length of the third lens L3 is f3, and a focal length of the fourth lens L4 is f4. The camera optical lens 10 should satisfy a following condition (6):

$$-2.50 \leq f3/f4 < 0 \quad (6).$$

The condition (6) specifies a ratio of the focal length f3 of the third lens L3 and the focal length f4 of the fourth lens L4. The refractive power is reasonably assigned in such a manner that the system has a better imaging quality and lower sensitivity.

Further, it is preferable to set a numerical range of the condition (6) to a numerical range of a following condition (6-A).

$$-2.00 \leq f3/f4 < 0 \quad (6\text{-A}).$$

An on-axis thickness of the sixth lens L6 is defined as d11. The camera optical lens 10 should satisfy a following condition (7):

$$0.01 \leq d11/TTL \leq 0.20 \quad (7).$$

The condition (7) specifies a ratio of the on-axis thickness d11 of the sixth lens L6 and the total optical length TTL. Out of the range of the condition (7), it is difficult to achieve miniaturization in the FNO bright state.

Further, it is preferable to set a numerical range of the condition (7) to a numerical range of a following condition (7-A):

$$0.04 \leq d11/TTL \leq 0.13 \quad (7\text{-A}).$$

A perpendicular distance from a critical point on the image side surface of the sixth lens L6 to the optic axis is Yc62. The camera optical lens 10 should satisfy a following condition (8):

$$0.10 \leq Yc62/TTL \leq 0.55 \quad (8).$$

The condition (8) specifies a ratio of a position of the critical point of the sixth lens L6 and the total optical length TTL. Out of the range of the condition (8), it is difficult to correct an aberration and a distortion of the camera optical lens 10.

Further, it is preferable to set a numerical range of the condition (8) to a numerical range of a following condition (8-A):

$$0.20 \leq Yc62/TTL \leq 0.30 \quad (8\text{-A}).$$

An FNO of the camera optical lens 10 is smaller than or equal to 2.00. The FNO is an F number of the camera optical lens. When this condition is satisfied, the camera optical lens 10 will have a good brightness, so as to satisfy the demand for a large aperture and also make night imaging effect better.

With such design, the total optical length TTL of the camera optical lens 10 can be made as short as possible, and thus the characteristics of wide-angle and miniaturization can be maintained while satisfying the demand for a large aperture.

In the following, examples will be used to describe the camera optical lens 10 of the present disclosure. The symbols recorded in each example will be described as follows. The focal length, on-axis distance, curvature radius, on-axis thickness, inflexion point position, and critical point position are all in units of mm. The FOV (field of view) is in a unit of °.

f: focal length of the camera optical lens 10;
f1: focal length of the first lens L1;
f2: focal length of the second lens L2;
f3: focal length of the third lens L3;
f4: focal length of the fourth lens L4;
FNO: F number;
2ω: FOV (field of view);
S1: aperture;
R: curvature radius of an optical surface, a central curvature radius for a lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;

R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of an object side surface of the optical filter GF;
R14: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.
TTL: optical length (the total optical length from the object side surface of the first lens to the image plane of the camera optical lens along the optic axis) in mm.
LB: on-axis distance from the image side surface of the sixth lens L6 to the image plane (including a thickness of the optical filter GF);
IH: Image Height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (9)$$

Here, k is a conic coefficient, A4, A6, A8, A10, A12, A14, A16, A18, A20 are aspherical surface coefficients, x is a perpendicular distance between a point on an aspheric surface curve and the optic axis, and y is an aspherical surface depth (a perpendicular distance between the point on an aspherical surface having a distance of x from the optic axis and a tangent plane tangent to an apex on the aspherical surface optic axis).

For convenience, the aspheric surface of each lens surface uses the aspheric surfaces shown in the above formula (9). However, the present disclosure is not limited to the aspherical polynomials form shown in the formula (9).

Preferably, inflexion points and/or arrest points can be arranged on the object side surface and/or image side surface of the lens, so as to satisfy the demand for the high quality imaging. The description below can be referred to for specific implementations.

Design data of the camera optical lens 10 in Embodiment 1 of the present disclosure is shown in Tables 1 and 2.

TABLE 1

|  | R | d |  | nd |  | vd |
|---|---|---|---|---|---|---|
| S1 | ∞ | d0 = | −0.600 |  |  |  |
| R1 | 2.124 | d1 = | 1.025 | nd1 | 1.5439 | v1 | 55.95 |
| R2 | 8.951 | d2 = | 0.171 |  |  |  |
| R3 | 12.166 | d3 = | 0.323 | nd2 | 1.6713 | v2 | 19.24 |
| R4 | 4.589 | d4 = | 0.448 |  |  |  |
| R5 | 12.957 | d5 = | 0.375 | nd3 | 1.5835 | v3 | 28.00 |
| R6 | 10.177 | d6 = | 0.296 |  |  |  |
| R7 | 8.118 | d7 = | 0.400 | nd4 | 1.6150 | v4 | 25.92 |
| R8 | 10.930 | d8 = | 0.612 |  |  |  |
| R9 | 23.466 | d9 = | 0.738 | nd5 | 1.5439 | v5 | 55.95 |
| R10 | −2.480 | d10 = | 0.411 |  |  |  |
| R11 | −5.595 | d11 = | 0.598 | nd6 | 1.5352 | v6 | 56.12 |
| R12 | 2.378 | d12 = | 0.300 |  |  |  |
| R13 | ∞ | d13 = | 0.210 | ndg | 1.5168 | vg | 64.17 |
| R14 | ∞ | d14 = | 0.770 |  |  |  |

Table 2 shows aspherical surface data of each lens in the camera optical lens 10 in Embodiment 1 of the present disclosure.

TABLE 2

|  | Conic coefficient | Aspherical Surface coefficient | | | | |
|---|---|---|---|---|---|---|
|  | k | A4 | A6 | A8 | A10 | A12 |
| R1 | 1.5342E−02 | −2.3362E−04 | 9.0797E−04 | −2.3643E−03 | 3.0077E−03 | −1.9987E−03 |
| R2 | 4.5883E+00 | −2.6471E−02 | 1.2687E−02 | −4.0646E−03 | 4.8577E−04 | −4.9378E−05 |
| R3 | −3.8260E+00 | −4.6266E−02 | 4.0360E−02 | −1.4842E−02 | 3.1862E−03 | −3.8028E−04 |
| R4 | 2.8098E−01 | −2.2856E−02 | 2.9997E−02 | 7.1762E−03 | −2.3541E−02 | 2.0709E−02 |

TABLE 2-continued

| | | | | | | |
|---|---|---|---|---|---|---|
| R5 | 2.1445E+01 | −5.0618E−02 | 3.4937E−02 | −6.0403E−02 | 5.8961E−02 | −3.5912E−02 |
| R6 | 8.9109E+00 | −6.8079E−02 | 5.0880E−02 | −5.6032E−02 | 3.6467E−02 | −1.4847E−02 |
| R7 | 1.1988E+00 | −8.8173E−02 | 2.9236E−02 | −8.4161E−03 | −3.0498E−03 | 3.7120E−03 |
| R8 | −6.1958E+00 | −7.2320E−02 | 1.2017E−02 | 2.9259E−03 | −5.5053E−03 | 3.0474E−03 |
| R9 | 0.0000E+00 | −1.0825E−02 | −1.7555E−02 | 1.0194E−02 | −4.8260E−03 | 1.5208E−03 |
| R10 | −3.0660E+00 | 3.1185E−02 | −2.8604E−02 | 1.4092E−02 | −4.4012E−03 | 8.9663E−04 |
| R11 | 1.2494E−02 | −6.7456E−02 | 1.8386E−02 | −1.0328E−03 | −2.0299E−04 | 3.3549E−05 |
| R12 | −9.5226E+00 | −5.1549E−02 | 1.8725E−02 | −4.9930E−03 | 9.3779E−04 | −1.2324E−04 |

| | Aspherical Surface coefficient | | | |
|---|---|---|---|---|
| | A14 | A16 | A18 | A20 |
| R1 | 6.5584E−04 | −9.1833E−05 | 0.0000E+00 | 0.0000E+00 |
| R2 | 4.1440E−05 | −1.4318E−05 | 0.0000E+00 | 0.0000E+00 |
| R3 | 1.4634E−04 | −2.3837E−05 | 0.0000E+00 | 0.0000E+00 |
| R4 | −8.7601E−03 | 1.6903E−03 | 0.0000E+00 | 0.0000E+00 |
| R5 | 1.1721E−02 | −1.6126E−03 | 0.0000E+00 | 0.0000E+00 |
| R6 | 3.1509E−03 | −2.5833E−04 | 0.0000E+00 | 0.0000E+00 |
| R7 | −1.2395E−03 | 1.3660E−04 | 0.0000E+00 | 0.0000E+00 |
| R8 | −7.1103E−04 | 6.0276E−05 | 0.0000E+00 | 0.0000E+00 |
| R9 | −3.0237E−04 | 3.7630E−05 | −2.6802E−06 | 8.2569E−08 |
| R10 | −1.1513E−04 | 8.6503E−06 | −3.2579E−07 | 3.9621E−09 |
| R11 | −1.0253E−06 | −1.3185E−07 | 1.1994E−08 | −2.9666E−10 |
| R12 | 1.0948E−05 | −6.2128E−07 | 2.0259E−08 | −2.8797E−10 |

Tables 3 and 4 show design data of the inflection point and the critical point of each lens in the camera optical lens 10 according to Embodiment 1 of the present disclosure. P1R1 and P1R2 represent the object side surface and the image side surface of the first lens L1, respectively. P2R1 and P2R2 represent the object side surface and the image side surface of the second lens L2, respectively. P3R1 and P3R2 represent the object side surface and the image side surface of the third lens L3, respectively. P4R1 and P4R2 represent the object side surface and the image side surface of the fourth lens L4, respectively. P5R1 and P5R2 respectively represent the object side surface and the image side surface of the fifth lens L5. P6R1, P6R2 represent the object side surface and the image side surface of the sixth lens L6, respectively. An "inflection point position" field corresponds to data that are perpendicular distances from the inflection point set by each lens surface to the optic axis of the camera optical lens 10. The "critical point position" field corresponds to data that are perpendicular distances from the critical point of each lens surface to the optic axis of the camera optical lens 10.

TABLE 3

| | Number of inflexion points | Inflexion point position 1 | Inflexion point position 2 |
|---|---|---|---|
| P1R1 | 1 | 1.605 | |
| P1R2 | 1 | 1.015 | |
| P2R1 | 0 | | |
| P2R2 | 0 | | |
| P3R1 | 1 | 0.405 | |
| P3R2 | 1 | 0.405 | |
| P4R1 | 1 | 0.365 | |
| P4R2 | 2 | 0.335 | 1.675 |
| P5R1 | 2 | 0.565 | 2.125 |
| P5R2 | 2 | 2.015 | 2.345 |
| P6R1 | 2 | 1.605 | 3.315 |
| P6R2 | 2 | 0.685 | 3.395 |

TABLE 4

| | Number of critical points | Critical point position |
|---|---|---|
| P1R1 | 0 | |
| P1R2 | 1 | 1.495 |
| P2R1 | 0 | |

TABLE 4-continued

| | Number of critical points | Critical point position |
|---|---|---|
| P2R2 | 0 | |
| P3R1 | 1 | 0.695 |
| P3R2 | 1 | 0.715 |
| P4R1 | 1 | 0.655 |
| P4R2 | 1 | 0.585 |
| P5R1 | 1 | 0.885 |
| P5R2 | 0 | |
| P6R1 | 1 | 2.985 |
| P6R2 | 1 | 1.635 |

Figure 2:
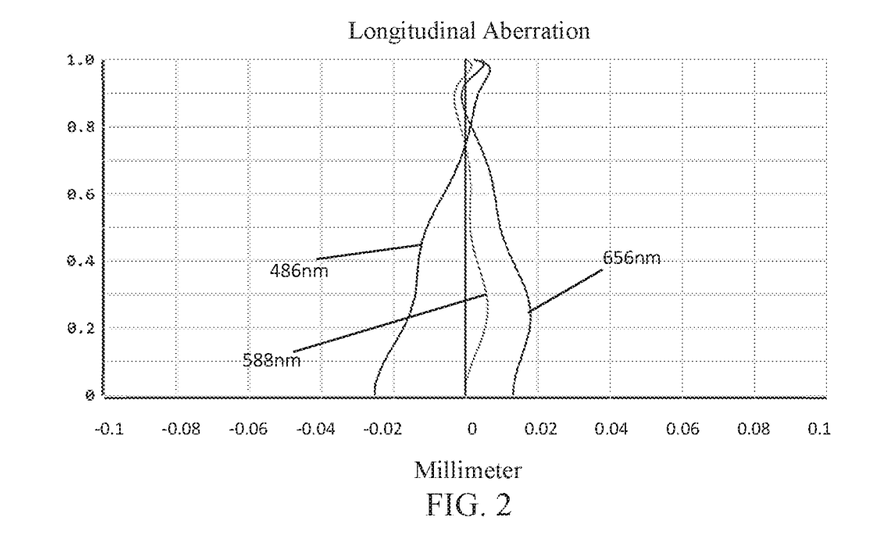
FIG. 2 is a schematic diagram of a longitudinal aberration of the camera optical lens shown in FIG. 1.
Figure 3:
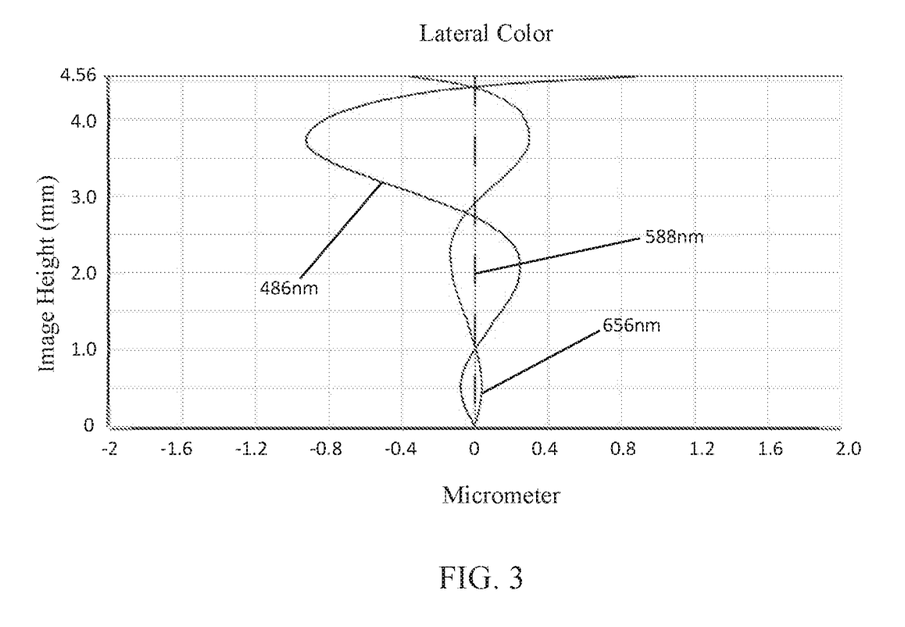
FIG. 3 is a schematic diagram of a lateral color of the camera optical lens shown in FIG. 1.
Figure 4:
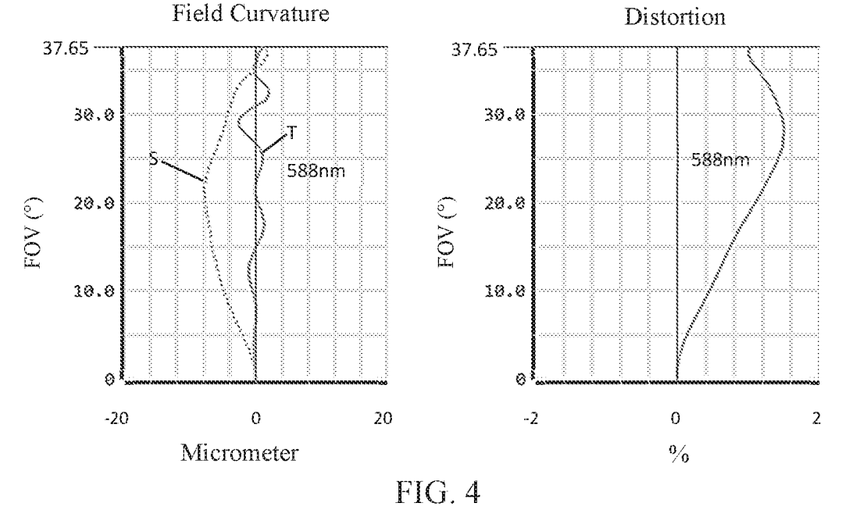
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 486 nm, 588 nm, and 656 nm after passing the camera optical lens 10 according to Embodiment 1, respectively. FIG. 4 illustrates a field curvature and a distortion of light with a wavelength of 588 nm after passing the camera optical lens 10 according to Embodiment 1, in which a field curvature S is a field curvature in a sagittal direction and T is a field curvature in a tangential direction.

Table 13 which is shown later shows various values of Embodiments 1, 2 and 3 and values corresponding to parameters which are specified in the above conditions.

As shown in Table 13, Embodiment 1 satisfies the above conditions.

In this embodiment, the entrance pupil diameter ENPD of the camera optical lens is 3.272 mm. The image height of 1.0H is 4.560 mm. The FOV 2ω is 78.295° in a diagonal direction. Thus, the camera optical lens has a wide-angle and is ultra-thin. Its on-axis and off-axis chromatic aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

Figure 5:
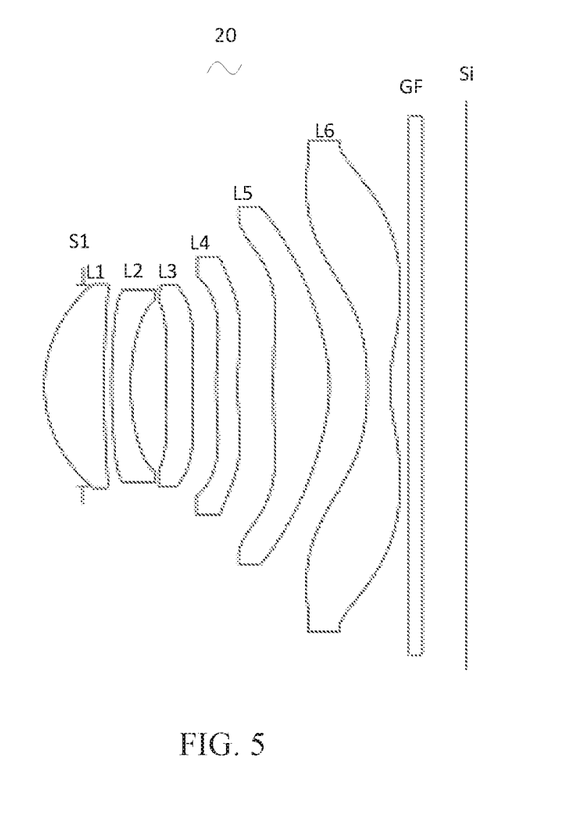
FIG. 5 is a schematic diagram of a structure of a camera optical lens in accordance with Embodiment 2 of the present disclosure.

Table 5 and Table 6 show design data of a camera optical lens 20 in Embodiment 2 of the present disclosure.

TABLE 5

|  | R | d | nd | vd |
|---|---|---|---|---|
| S1 | ∞ | d0 = −0.600 | | |
| R1 | 2.137 | d1 = 0.930 | nd1 1.5439 | v1 55.95 |
| R2 | 11.984 | d2 = 0.121 | | |
| R3 | 7.765 | d3 = 0.300 | nd2 1.6713 | v2 19.24 |
| R4 | 3.543 | d4 = 0.552 | | |
| R5 | 31.078 | d5 = 0.421 | nd3 1.5835 | v3 28.00 |
| R6 | 21.515 | d6 = 0.360 | | |
| R7 | 5.222 | d7 = 0.336 | nd4 1.6150 | v4 25.92 |
| R8 | 5.179 | d8 = 0.560 | | |
| R9 | 16.860 | d9 = 0.878 | nd5 1.5439 | v5 55.95 |
| R10 | −2.476 | d10 = 0.592 | | |
| R11 | −5.503 | d11 = 0.351 | nd6 1.5352 | v6 56.12 |
| R12 | 2.364 | d12 = 0.300 | | |
| R13 | ∞ | d13 = 0.210 | ndg 1.5168 | vg 64.17 |
| R14 | ∞ | d14 = 0.690 | | |

Table 6 shows aspherical surface data of each lens in the camera optical lens 20 in Embodiment 2 of the present disclosure.

TABLE 6

| | Conic coefficient | Aspherical Surface coefficient | | | | |
|---|---|---|---|---|---|---|
| | k | A4 | A6 | A8 | A10 | A12 |
| R1 | 2.6021E−02 | 2.9107E−04 | 1.4280E−03 | −1.9057E−03 | 1.9303E−03 | −1.1475E−03 |
| R2 | 1.7994E+01 | −2.7383E−02 | 2.2984E−02 | −1.2122E−02 | 3.6250E−03 | −5.7212E−04 |
| R3 | 4.4297E−01 | −4.9101E−02 | 4.8734E−02 | −2.6862E−02 | 1.0613E−02 | −2.7912E−03 |
| R4 | 1.5047E+00 | −2.6830E−02 | 2.9481E−02 | 2.5839E−03 | −2.5160E−02 | 2.7364E−02 |
| R5 | 0.0000E+00 | −3.5105E−02 | 1.5118E−02 | −3.7096E−02 | 4.7234E−02 | −4.2390E−02 |
| R6 | −5.2834E+01 | −4.8495E−02 | 2.3006E−02 | −1.8153E−02 | 3.4636E−03 | 2.3283E−03 |
| R7 | −1.3608E+01 | −7.9479E−02 | 2.2187E−02 | −1.9282E−03 | −4.0780E−03 | 2.0926E−03 |
| R8 | −3.0153E+01 | −5.4532E−02 | −4.4365E−04 | 9.5741E−03 | −6.3925E−03 | 2.1533E−03 |
| R9 | 0.0000E+00 | 4.8283E−03 | −1.4875E−02 | 5.8803E−03 | −2.0804E−03 | 4.8386E−04 |
| R10 | −6.5314E+00 | 1.6667E−02 | −1.4202E−02 | 6.7479E−03 | −2.4259E−03 | 5.7889E−04 |
| R11 | −4.2179E−01 | −5.7775E−02 | 1.7352E−02 | −2.8784E−03 | 4.6227E−04 | −6.7646E−05 |
| R12 | −1.0614E+01 | −5.0421E−02 | 1.7020E−02 | −4.2617E−03 | 7.4376E−04 | −8.9101E−05 |

| | Aspherical Surface coefficient | | | |
|---|---|---|---|---|
| | A14 | A16 | A18 | A20 |
| R1 | 3.6415E−04 | −5.3279E−05 | 0.0000E+00 | 0.0000E+00 |
| R2 | 4.1239E−05 | −4.0855E−06 | 0.0000E+00 | 0.0000E+00 |
| R3 | 5.5992E−04 | −5.3348E−05 | 0.0000E+00 | 0.0000E+00 |
| R4 | −1.3038E−02 | 2.5979E−03 | 0.0000E+00 | 0.0000E+00 |
| R5 | 2.4179E−02 | −8.0785E−03 | 1.2094E−03 | 0.0000E+00 |
| R6 | −1.6757E−03 | 3.1884E−04 | 0.0000E+00 | 0.0000E+00 |
| R7 | −4.6908E−04 | 4.0271E−05 | 0.0000E+00 | 0.0000E+00 |
| R8 | −3.5383E−04 | 2.2667E−05 | 0.0000E+00 | 0.0000E+00 |
| R9 | −6.1896E−05 | 3.9513E−06 | −8.6289E−08 | −1.0170E−09 |
| R10 | −8.6159E−05 | 7.7649E−06 | −3.9526E−07 | 8.8913E−09 |
| R11 | 6.9471E−06 | −4.3896E−07 | 1.5322E−08 | −2.2669E−10 |
| R12 | 7.0546E−06 | −3.4801E−07 | 9.6036E−09 | −1.1218E−10 |

Design data of the camera optical lens 20 in Embodiment 2 of the present disclosure is shown in Tables 7 and 8.

TABLE 7

| | Number of inflexion points | Inflexion point position 1 | Inflexion point position 2 | Inflexion point position 3 |
|---|---|---|---|---|
| P1R1 | 0 | | | |
| P1R2 | 1 | 1.355 | | |
| P2R1 | 0 | | | |
| P2R2 | 0 | | | |
| P3R1 | 1 | 0.295 | | |
| P3R2 | 2 | 0.295 | 1.545 | |
| P4R1 | 1 | 0.455 | | |
| P4R2 | 2 | 0.475 | 1.815 | |
| P5R1 | 3 | 0.735 | 2.255 | 3.125 |
| P5R2 | 0 | | | |
| P6R1 | 1 | 1.755 | | |
| P6R2 | 2 | 0.665 | 3.455 | |

TABLE 8

| | Number of critical points | Critical point position 1 | Critical point position 2 |
|---|---|---|---|
| P1R1 | 0 | | |
| P1R2 | 0 | | |
| P2R1 | 0 | | |
| P2R2 | 0 | | |
| P3R1 | 1 | 0.495 | |
| P3R2 | 1 | 0.525 | |
| P4R1 | 1 | 0.825 | |
| P4R2 | 1 | 0.855 | |
| P5R1 | 2 | 1.115 | 2.695 |
| P5R2 | 0 | | |
| P6R1 | 1 | 3.225 | |
| P6R2 | 2 | 1.535 | 3.895 |

Figure 6:
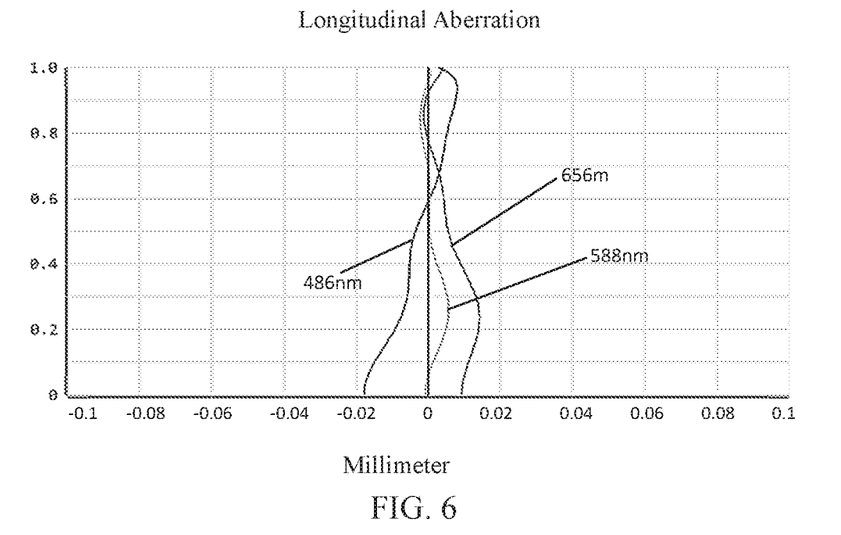
FIG. 6 is a schematic diagram of a longitudinal aberration of the camera optical lens shown in FIG. 5.
Figure 7:
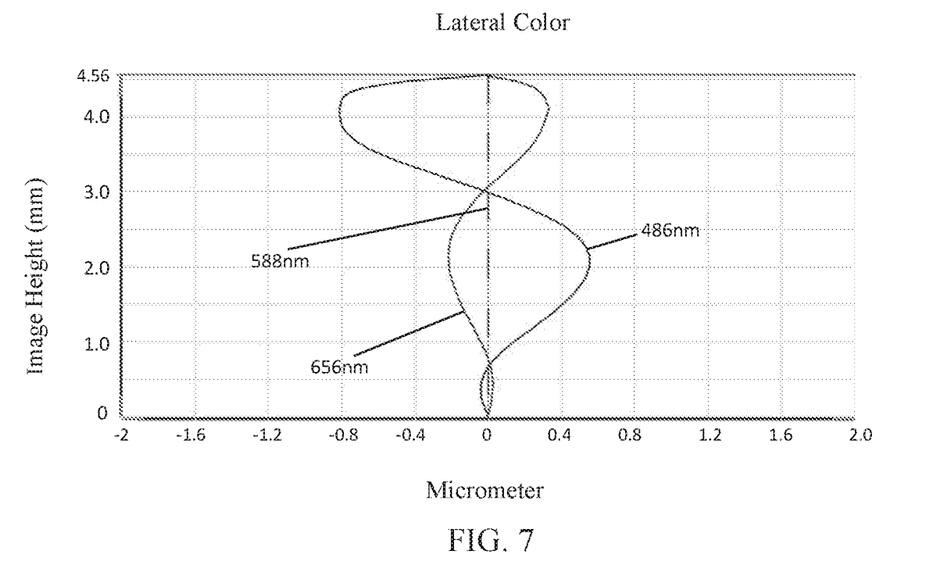
FIG. 7 is a schematic diagram of a lateral color of the camera optical lens shown in FIG. 5.
Figure 8:
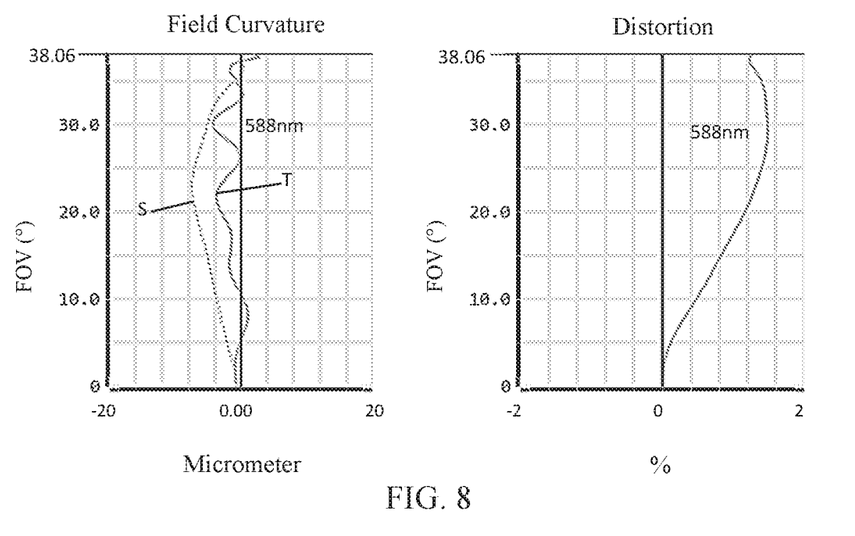
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 486 nm, 588 nm, and 656 nm after passing the camera optical lens 20 according to Embodiment 2, respectively. FIG. 8 illustrates a field curvature and a distortion of light with a wavelength of 588 nm after passing the camera optical lens 20 according to Embodiment 2.

As shown in Table 13, Embodiment 2 satisfies the above conditions.

In this embodiment, the entrance pupil diameter ENPD of the camera optical lens is 3.231 mm. The image height of 1.0H is 4.560 mm. The FOV 2ω is 76.117° in a diagonal direction. Thus, the camera optical lens has a wide-angle and is ultra-thin. Its on-axis and off-axis chromatic aberrations are fully corrected, thereby achieving excellent optical characteristics Embodiment 3

Embodiment 3 is basically the same as Embodiment 1 and involves symbols having the same meanings as Embodiment 1, and only differences therebetween will be described in the following.

Figure 9:
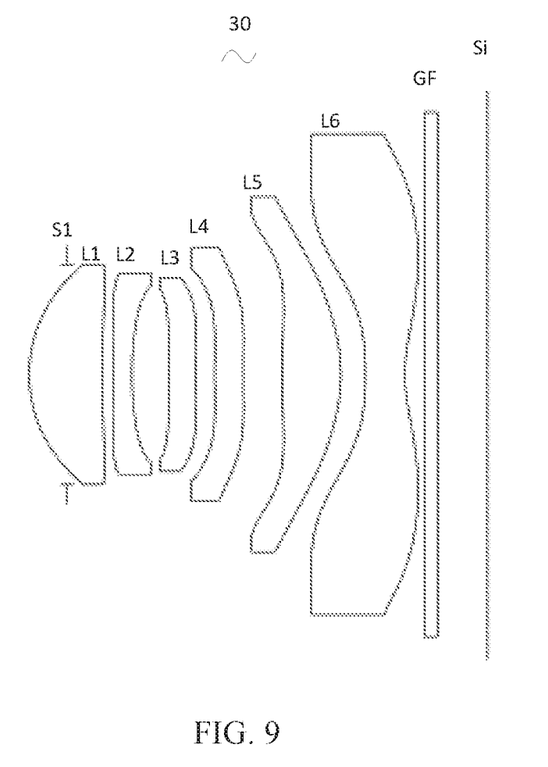
FIG. 9 is a schematic diagram of a structure of a camera optical lens in accordance with Embodiment 3 of the present disclosure.

Table 9 and Table 10 show design data of a camera optical lens 30 in Embodiment 3 of the present disclosure.

TABLE 9

|  | R | d |  |  |  |  |
|---|---|---|---|---|---|---|
| S1 | ∞ | d0 = | −0.600 |  |  |  |
| R1 | 2.233 | d1 = | 1.143 | nd1 | 1.5439 | v1 | 55.95 |
| R2 | 12.456 | d2 = | 0.169 |  |  |  |
| R3 | 26.071 | d3 = | 0.301 | nd2 | 1.6713 | v2 | 19.24 |
| R4 | 5.547 | d4 = | 0.574 |  |  |  |
| R5 | 40.494 | d5 = | 0.429 | nd3 | 1.5835 | v3 | 28.00 |
| R6 | 30.538 | d6 = | 0.292 |  |  |  |
| R7 | 15.392 | d7 = | 0.450 | nd4 | 1.6150 | v4 | 25.92 |
| R8 | 15.222 | d8 = | 0.611 |  |  |  |
| R9 | 14.415 | d9 = | 0.918 | nd5 | 1.5439 | v5 | 55.95 |
| R10 | −2.703 | d10 = | 0.386 |  |  |  |
| R11 | −5.914 | d11 = | 0.618 | nd6 | 1.5352 | v6 | 56.12 |
| R12 | 2.408 | d12 = | 0.300 |  |  |  |
| R13 | ∞ | d13 = | 0.210 | ndg | 1.5168 | vg | 64.17 |
| R14 | ∞ | d14 = | 0.787 |  |  |  |

Table 10 shows aspherical surface data of each lens in the camera optical lens 30 in Embodiment 3 of the present disclosure.

TABLE 10

| | Conic coefficient | Aspherical Surface coefficient | | | | |
|---|---|---|---|---|---|---|
| | k | A4 | A6 | A8 | A10 | A12 |
| R1 | 2.9030E−02 | 1.4761E−04 | −2.3134E−04 | 2.7074E−04 | −5.1945E−05 | −1.2445E−04 |
| R2 | 1.3194E+01 | −2.1548E−02 | 8.7901E−03 | −2.6806E−03 | 8.5707E−04 | −5.6714E−04 |
| R3 | 9.7078E+01 | −3.7315E−02 | 3.1277E−02 | −1.1104E−02 | 2.7491E−03 | −7.3260E−04 |
| R4 | 8.2331E−01 | −1.5747E−02 | 2.4598E−02 | 8.8028E−04 | −1.2717E−02 | 1.2557E−02 |
| R5 | 0.0000E+00 | −3.4133E−02 | 1.1764E−02 | −2.5090E−02 | 2.1812E−02 | −1.2573E−02 |
| R6 | 4.9372E+01 | −5.0785E−02 | 2.9761E−02 | −3.4825E−02 | 2.1648E−02 | −8.5870E−03 |
| R7 | −9.0509E+00 | −7.8858E−02 | 2.7288E−02 | −1.2535E−02 | 1.8232E−03 | 7.2242E−04 |
| R8 | −6.1684E+00 | −6.6567E−02 | 1.3032E−02 | −3.0453E−04 | −2.5963E−03 | 1.5640E−03 |
| R9 | 0.0000E+00 | −7.3317E−03 | −9.1607E−03 | 4.2998E−03 | −1.8352E−03 | 5.4120E−04 |
| R10 | −2.5654E+00 | 2.7484E−02 | −2.0997E−02 | 8.8177E−03 | −2.5845E−03 | 5.3772E−04 |
| R11 | 1.0313E−01 | −6.1907E−02 | 1.8227E−02 | −2.9646E−03 | 6.3356E−04 | −1.3444E−04 |
| R12 | −9.1429E+00 | −4.3707E−02 | 1.5038E−02 | −3.7717E−03 | 6.7475E−04 | −8.4283E+05 |

| | Aspherical Surface coefficient | | | |
|---|---|---|---|---|
| | A14 | A16 | A18 | A20 |
| R1 | 7.5004E−05 | −1.6823E−05 | 0.0000E+00 | 0.0000E+00 |
| R2 | 2.0019E−04 | −2.5581E−05 | 0.0000E+00 | 0.0000E+00 |
| R3 | 2.6929E−04 | −3.1919E−05 | 0.0000E+00 | 0.0000E+00 |
| R4 | −5.6226E−03 | 1.1007E−03 | 0.0000E+00 | 0.0000E+00 |
| R5 | 4.1111E−03 | −7.1492E−04 | 4.5267E−05 | 0.0000E+00 |
| R6 | 1.8891E−03 | −1.7637E−04 | 0.0000E+00 | 0.0000E+00 |
| R7 | −2.5990E−04 | 1.5989E−05 | 0.0000E+00 | 0.0000E+00 |
| R8 | −3.5246E−04 | 2.8155E−05 | 0.0000E+00 | 0.0000E+00 |
| R9 | −9.8421E−05 | 1.0843E−05 | −6.5093E−07 | 1.5657E−08 |
| R10 | −7.3219E−05 | 5.9050E−06 | −2.4265E−07 | 3.4975E−09 |
| R11 | 1.8132E−05 | −1.4133E−06 | 5.9159E−08 | −1.0385E−09 |
| R12 | 7.0619E−06 | −3.7448E−07 | 1.1294E−08 | −1.4698E−10 |

Design data of the camera optical lens 30 in Embodiment 3 of the present disclosure is shown in Tables 11 and 12.

TABLE 11

|  | Number of inflexion points | Inflexion point position 1 | Inflexion point position 2 | Inflexion point position 3 | Inflexion point position 4 |
|---|---|---|---|---|---|
| P1R1 | 1 | 1.675 | | | |
| P1R2 | 1 | 0.785 | | | |
| P2R1 | 2 | 0.345 | 0.765 | | |
| P2R2 | 0 | | | | |
| P3R1 | 1 | 0.255 | | | |
| P3R2 | 1 | 0.245 | | | |
| P4R1 | 1 | 0.275 | | | |
| P4R2 | 2 | 0.295 | 1.755 | | |
| P5R1 | 2 | 0.645 | 2.215 | | |
| P5R2 | 4 | 2.115 | 2.395 | 2.505 | 2.775 |
| P6R1 | 2 | 1.665 | 3.295 | | |
| P6R2 | 2 | 0.735 | 3.605 | | |

TABLE 12

|  | Number of critical points | Critical point position 1 |
|---|---|---|
| P1R1 | 0 | |
| P1R2 | 1 | 1.435 |
| P2R1 | 0 | |
| P2R2 | 0 | |
| P3R1 | 1 | 0.435 |
| P3R2 | 1 | 0.425 |
| P4R1 | 1 | 0.475 |
| P4R2 | 1 | 0.515 |
| P5R1 | 1 | 1.035 |
| P5R2 | 0 | |
| P6R1 | 1 | 3.105 |
| P6R2 | 1 | 1.865 |

Figure 10:
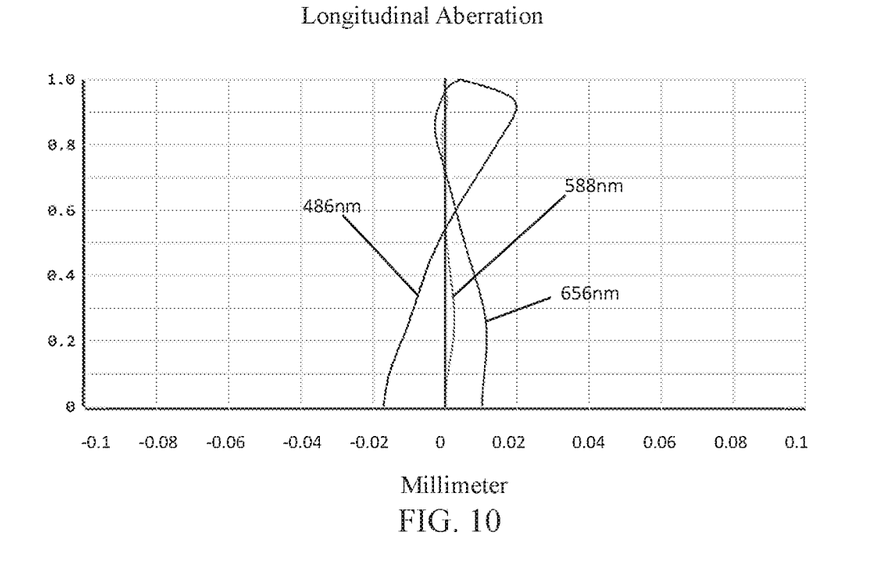
FIG. 10 is a schematic diagram of a longitudinal aberration of the camera optical lens shown in FIG. 9.
Figure 11:
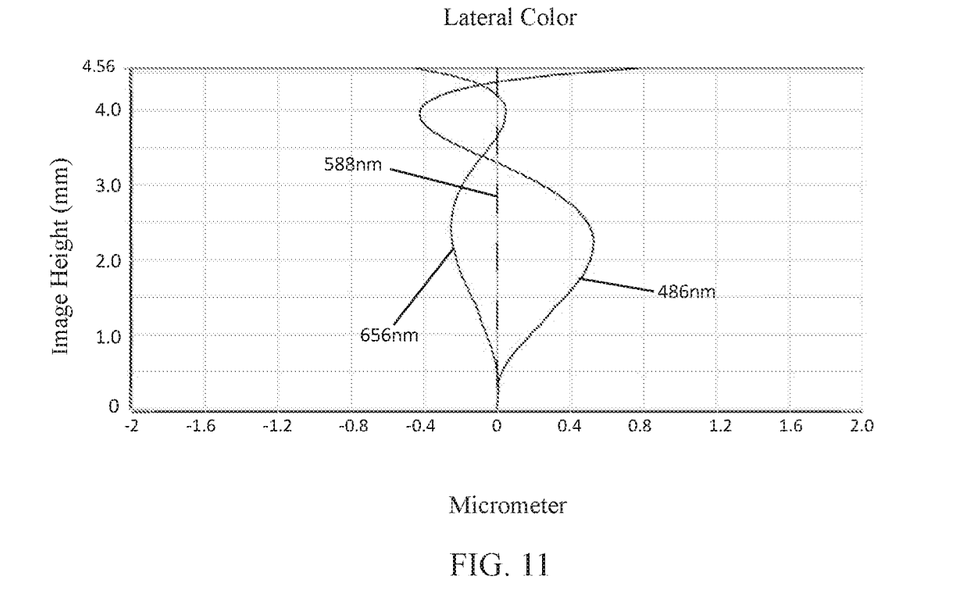
FIG. 11 is a schematic diagram of a lateral color of the camera optical lens shown in FIG. 9.
Figure 12:
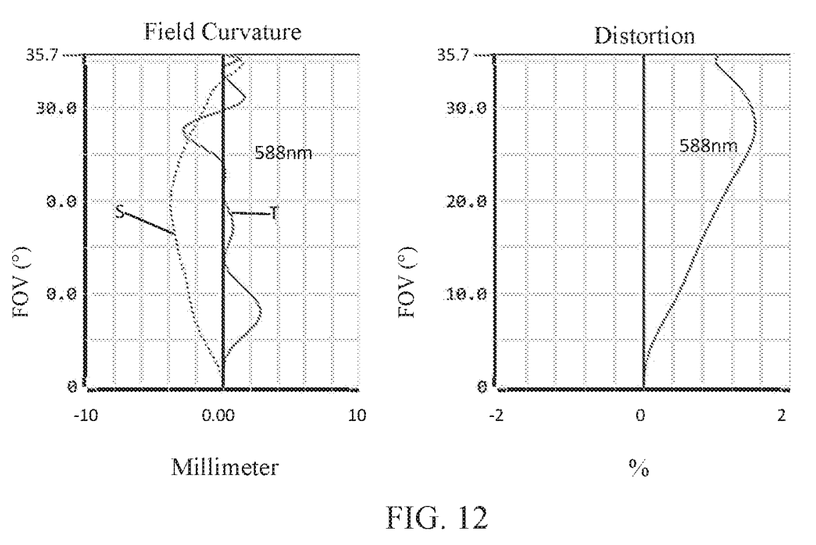
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 486 nm, 588 nm, and 656 nm after passing the camera optical lens 30 according to Embodiment 3 respectively. FIG. 12 illustrates a field curvature and a distortion of light with a wavelength of 588 nm after passing the camera optical lens 30 according to Embodiment 3.

Table 13 in the following lists values corresponding to the respective conditions in this embodiment. It is apparent that the imaging optical system of the present embodiment satisfies the above conditional expression.

In this embodiment, the entrance pupil diameter ENPD of the camera optical lens is 3.541 mm. The image height of 1.0H is 4.56 mm. The FOV 2ω is 71.451° in a diagonal direction. Thus, the camera optical lens has a wide-angle and is ultra-thin and its on-axis and off-axis chromatic aberrations are fully corrected, thereby achieving excellent optical characteristics.

Table 13 shows various values of Embodiments 1, 2 and 3 and values corresponding to parameters which are specified in conditions of (1)-(8). In addition, units of the values shown in Table 13 are: 2ω (°), f (mm), f1 (mm), f2 (mm), f3 (mm), f4 (mm), f5 (mm), f6 (mm), TTL (mm), LB (mm), IH (mm).

TABLE 13

| Parameters and conditions | Embodiment 1 | Embodiment 2 | Embodiment 3 | Remark |
|---|---|---|---|---|
| R3/R4 | 2.65 | 2.19 | 4.70 | Condition (1) |
| R1/d1 | 2.07 | 2.30 | 1.95 | Condition (2) |
| R2/R3 | 0.74 | 1.54 | 0.48 | Condition (3) |
| n2/n3 | 1.06 | 1.06 | 1.06 | Condition (4) |
| R9/R10 | −9.46 | −6.81 | −5.33 | Condition (5) |
| f3/f4 | −1.76 | −0.24 | −0.001 | Condition (6) |
| d11/TTL | 0.09 | 0.05 | 0.09 | Condition (7) |
| Yc62/TTL | 0.24 | 0.23 | 0.26 | Condition (8) |
| FNO | 1.788 | 1.780 | 1.772 | |
| 2ω | 75.295 | 76.117 | 71.451 | |
| f | 5.851 | 5.750 | 6.275 | |
| f1 | 4.863 | 4.626 | 4.812 | |
| f2 | −11.167 | −9.991 | −10.558 | |
| f3 | −85.535 | −121.809 | −216.288 | |
| f4 | 48.682 | 516.877 | 359551.607 | |
| f5 | 4.165 | 4.034 | 4.266 | |
| f6 | −3.039 | −3.042 | −3.117 | |
| TTL | 6.677 | 6.601 | 7.188 | |
| LB | 1.280 | 1.200 | 1.297 | |
| IH | 4.560 | 4.560 | 4.560 | |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side:
    a first lens having a positive refractive power;
    a second lens having a negative refractive power;
    a third lens having a negative refractive power;
    a fourth lens having a positive refractive power;
    a fifth lens having a positive refractive power; and
    a sixth lens having a negative refractive power,
    wherein the camera optical lens satisfies the following conditions:
    $2.00 \leq R3/R4 \leq 5.00$;
    $1.50 \leq R1/d1 \leq 3.00$;
    $0.30 \leq R2/R3 \leq 0.74$;
    $-13.00 \leq R9/R10 \leq -3.00$; and
    $1.02 \leq n2/n3 \leq 1.20$,
    where
    R3 denotes an on-axis curvature radius of an object side surface of the second lens;
    R4 denotes an on-axis curvature radius of an image side surface of the second lens;
    R1 denotes an on-axis curvature radius of an object side surface of the first lens;
    d1 denotes an on-axis thickness of the first lens;
    R2 denotes an on-axis curvature radius of an image side surface of the first lens;
    R9 denotes an on-axis curvature radius of an object side surface of the fifth lens;
    R10 denotes an on-axis curvature radius of an image side surface of the fifth lens;
    n2 denotes a refractive index of the second lens; and
    n3 denotes a refractive index of the third lens.

2. The camera optical lens as described in claim 1, further satisfying a following condition:
    $-12.00 \leq R9/R10 \leq -5.00$.

3. The camera optical lens as described in claim 1, further satisfying a following condition:
    $-2.50 \leq f3/f4 < 0$,
    where
    f3 denotes a focal length of the third lens; and
    f4 denotes a focal length of the fourth lens.

4. The camera optical lens as described in claim 3, further satisfying a following condition:

$-2.00 \leq f3/f4 < 0$.

5. The camera optical lens as described in claim 1, further satisfying a following condition:

$0.01 \leq d11/TTL \leq 0.20$, where d11 denotes an on-axis thickness of the sixth lens; and TTL denotes a total optical length from the object side surface of the first lens to an image plane of the camera optical lens along an optic axis.

6. The camera optical lens as described in claim 5, further satisfying a following condition:

$0.04 \leq d11/TTL \leq 0.13$.

7. The camera optical lens as described in claim 1, further satisfying a following condition:

$0.10 \leq Yc62/TTL \leq 0.55$, where

Yc62 denotes a perpendicular distance from a critical point on an image side surface of the sixth lens to an optic axis; and TTL denotes a total optical length from the object side surface of the first lens to an image plane of the camera optical lens along the optic axis.

8. The camera optical lens as described in claim 7, further satisfying a following condition:

$0.20 \leq Yc62/TTL \leq 0.30$.

9. The camera optical lens as described in claim 1, wherein an FNO of the camera optical lens is smaller than or equal to 2.00.

* * * * *